United States Patent
Obrist et al.

(10) Patent No.: US 6,886,355 B2
(45) Date of Patent: May 3, 2005

(54) AIR-CONDITIONING SYSTEM

(75) Inventors: Frank Obrist, Dornbirn (AT); Tilo Schafer, Daubach (DE); Georg Weber, Egelsbach (DE)

(73) Assignee: LuK Fahrzeug-Hydraulik GmbH & Co. KG, Bad Homburg (DE)

( * ) Notice: Subject to any disclaimer, the term of this patent is extended or adjusted under 35 U.S.C. 154(b) by 0 days.

(21) Appl. No.: 10/446,639

(22) Filed: May 21, 2003

(65) Prior Publication Data

US 2004/0045306 A1 Mar. 11, 2004

Related U.S. Application Data

(63) Continuation of application No. PCT/DE01/03778, filed on Sep. 26, 2001.

(30) Foreign Application Priority Data

Nov. 23, 2000  (DE) ......................................... 100 58 002

(51) Int. Cl.$^7$ .............................................. F25B 49/02
(52) U.S. Cl. .................. 62/196.3; 62/228.5; 417/222.2
(58) Field of Search ............................ 62/228.1, 228.3, 62/228.5, 196.4, 196.1, 196.3; 417/222.2

(56) References Cited

U.S. PATENT DOCUMENTS

| | | | | |
|---|---|---|---|---|
| 4,880,356 A | * | 11/1989 | Suzuki et al. | 417/53 |
| 6,213,728 B1 | * | 4/2001 | Kato et al. | 417/222.2 |
| 6,247,322 B1 | * | 6/2001 | Ban et al. | 62/228.3 |
| 6,332,496 B1 | * | 12/2001 | Takano et al. | 165/202 |

FOREIGN PATENT DOCUMENTS

| | | |
|---|---|---|
| DE | 196 07 032 A1 | 9/1996 |
| EP | 0 742 116 A2 | 11/1996 |

* cited by examiner

Primary Examiner—Harry B. Tanner
(74) Attorney, Agent, or Firm—Darby & Darby

(57) ABSTRACT

An air-conditioning system with a refrigerant medium circulating in a refrigerant loop has a variable-stroke compressor with a high-pressure outlet chamber, a drive chamber and an intake suction chamber. A first valve regulates a first flow of refrigerant medium from the high-pressure outlet chamber to the drive chamber, and a second valve regulates a second flow of refrigerant medium from the drive chamber to the intake suction chamber. The first and second valves operate independently of each other under the control of a control unit, and the variable stroke of the compressor is controlled by the first and/or second flow of refrigerant medium.

10 Claims, 1 Drawing Sheet

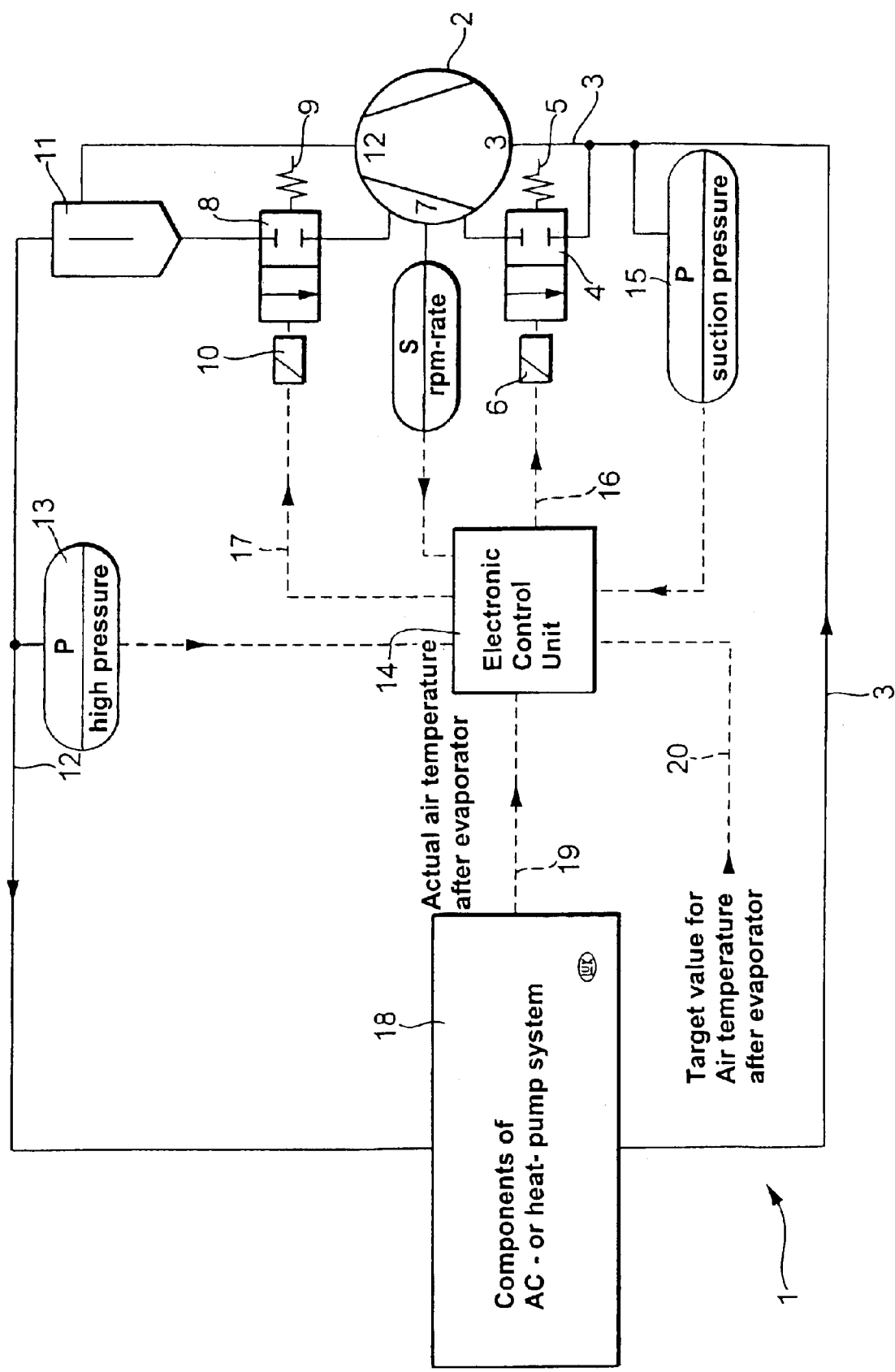

AIR-CONDITIONING SYSTEM

CROSS-REFERENCE TO RELATED APPLICATION

This application is a continuation of International Patent Application Serial No. PCT/DE01/03778, filed Sep. 26, 2001, which is hereby incorporated by reference in its entirety.

BACKGROUND OF THE INVENTION

1. Field of the Invention

The present invention relates to an air-conditioning system or a refrigerant loop with a variable-stroke compressor, wherein the stroke of the compressor is regulated by the inflow of refrigerant medium from a pressure outlet chamber into a drive chamber and/or by the discharge of refrigerant medium from the drive chamber into a suction pressure chamber.

2. Description of the Related Art

Conventional air-conditioning systems of the type described above include a valve with an internal mechanical suction pressure-regulating device. This suction pressure-regulating device may in some cases be of a type where a control target value can be set externally through a magnet.

Other conventional air-conditioning systems have a four- or two-way valve, which either pressurizes or depressurizes the drive chamber. These conventional air-conditioning systems suffer from the drawbacks that the valves with internal suction-pressure regulators can only regulate the suction pressure, that these valves have a considerable hysteresis that is detrimental to their regulating performance, and that they offer no possibility of effectively controlling lubricant circulation. Air-conditioning systems with four- or two-way valves for regulating the compressor do not allow the outflow and inflow to be controlled independently at the same time.

OBJECT OF THE INVENTION

The present invention has the objective to provide an air-conditioning system with a variable-stroke compressor, wherein the stroke of the compressor is regulated by the inflow of refrigerant medium from the outlet pressure chamber into a drive chamber and/or by the outflow of the refrigerant medium from the drive chamber to the suction pressure chamber, and wherein the inflow into the drive chamber and the outflow from the drive chamber can be controlled independently at the same time.

SUMMARY OF THE INVENTION

In an air-conditioning system meeting the foregoing general description, the objective stated above is met by providing two valves that are connected to a control device, where the two valves can be controlled independently of each other, one valve being arranged in the inflow path to the drive chamber and the other valve being arranged in the outflow path from the drive chamber.

In an air-conditioning system according to the invention, the control device by means of the two valves can regulate the pressure in the refrigerant loop to a constant level so as to maintain a constant pressure either at the outlet or at the inlet of the compressor.

According to another aspect of the present invention, the inflow valve to the drive chamber is controlled to open at regular intervals in order to ensure a sufficient lubrication of the compressor. The amount of lubrication can be allocated as necessary for each individual operating state. This prevents that more refrigerant medium than necessary flows into the drive chamber, which lowers the efficiency of the air-conditioning system and can cause the wobble plate to tilt back unintentionally. The lubricant is contained as an additive in the refrigerant medium.

In a further preferred embodiment of the inventive air-conditioning system, the pressure distribution can be stabilized by opening both valves simultaneously, whereby the quality of the regulation can be improved.

In a further preferred embodiment, the performance of the inventive air-conditioning system can be increased by minimizing the valve aperture, particularly by keeping one valve closed while the other valve is open.

According to another aspect of the present invention, the refrigerant flow through the system loop components can be minimized by opening both valves simultaneously, in order to keep the evaporator from freezing up when no cooling power is drawn from the air-conditioning system.

In a further embodiment of the inventive air-conditioning system, an effective limitation of the output pressure can be achieved through improvements in the regulation and in the dynamic response, particularly in cutting back the tilt angle of the wobble plate. Thus, the air-conditioning system can be operated at pressure levels near the permissible pressure limit.

According to another aspect of the present invention, either the outlet pressure or the suction pressure can be used as a control variable depending on whether the system is used as a heat pump or as a refrigeration system. In a further embodiment of the invention, the target value for the pressure to be set and maintained by the electrical regulation system by means of the two valves can be adjusted within a wide range, so that appropriate pressure levels can be set for operating the system in a refrigeration mode as well as a heat pump mode.

In a preferred embodiment of the invention, the cycle time of the valves can be increased when the system is in a stationary operating mode in order to increase the life span of the valves. The cyclic actuation of the valves can also be suspended when the compressor is in the "Off" mode.

With an air-conditioning system according to a preferred embodiment of the invention, a multitude of different control characteristics can by realized through the valves. Thus, the two independent valves make it possible to use control strategies that are adapted to a specific operating situation.

BRIEF DESCRIPTION OF THE DRAWING

The foregoing and other features of the present invention will be more readily apparent from the following detailed description and drawing in which:

FIG. 1 is a schematic of the refrigerant loop of an air-conditioning system according to the present invention.

DETAILED DESCRIPTION OF THE PREFERRED EMBODIMENTS

FIG. 1 is a schematic representation of a refrigerant loop of an air-conditioning system 1 according to an embodiment of the present invention. A compressor 2 has a valve 4 arranged in the intake or suction area 3 and connecting the latter with a drive chamber 7 of the compressor. The valve 4 is biased toward a closed position by a spring force 5. The valve 4 can be opened by means of a control device 6 such as an electromagnet 6 that counteracts the spring force 5 with an electromagnetically generated force. The electromagnet 6 can be actuated either by a current signal that produces a proportional valve displacement (as is the case with a so-called proportional magnet actuator) or by a pulse-width-modulated signal. The drive chamber 7 is further connected by way of a second valve 8 to a device 11 at the high-pressure outlet side 12 of the compressor 2. Valve 8 is operable independently of valve 4. Valve 8 is biased towards a closed position by a spring force 9 and can be opened by a magnetic device 10 acting against the spring force. The mechanism 11 schematically represents a lubricating device which directs the lubricant contained in the refrigerant from the high-pressure side 12 to the drive chamber 7 of the compressor 2. The lubricating device 11 provides lubrication to the drive chamber 7 in this manner and prevents that larger quantities of the lubricant are carried through the entire refrigerant loop. A pressure sensor 13, arranged on the high-pressure side 12 of the overall air-conditioning system loop, measures the pressure level on the high-pressure side 12 and sends the measurement values to an electronic processing system 14. A pressure sensor 15, arranged on the suction pressure side 3 of the air-conditioning system 1, signals the pressure values of the suction pressure side 3 to the electronic processing system 14. The electronic processing system 14 sends the appropriate control signals over control lines 16 and 17 to the magnetic valve actuators 6 and 10. The drawing further shows the other components of the overall system loop of the air-conditioning- or heat-pump system collectively represented as block 18. Over control line 19, an actual value of a control variable such as the air temperature after the evaporator is entered into the electronic processing system 14. Over control line 20, a target value for the air temperature after the evaporator is entered into the electronic processing system 14. In accordance with the controller strategies that are programmed into the electronic control system, the pressure levels in the drive chamber 7 of the compressor 2 are regulated by way of the valves 4 and 8 in such a manner that all of the control characteristics outlined above under "Summary of the Invention" can be realized as needed in a given situation.

As a particular advantage of the system according to the present invention, the concept of two independent valves opens up the possibility to use situation-specific control strategies for the operation of the variable-stroke compressor.

What is claimed is:

1. An air-conditioning system with a refrigerant medium circulating in a refrigerant loop, said system comprising:
    a variable-stroke compressor comprising a high-pressure outlet chamber, a drive chamber and an intake suction chamber;
    a first valve regulating a first flow of refrigerant medium from the high-pressure outlet chamber to the drive chamber;
    a second valve regulating a second flow of refrigerant medium from the drive chamber to the intake suction chamber; and
    a control unit; and
    an evaporator connected to said compressor in said refrigerant loop,
    wherein the variable stroke of the compressor is controlled by at least one of said first flow and said second flow, wherein said first and second valves are operable independently of each other under the control of the control unit, and wherein said circulation of refrigerant medium through said refrigerant loop can be minimized by simultaneously opening said first and second valves, whereby said evaporator is prevented from freezing over when no cooling power is drawn from the air-conditioning system.

2. The air-conditioning system of claim 1, wherein the control device is operable to set a constant pressure at a location in the refrigerant loop by means of said first and second valves, said location being one of the high-pressure outlet chamber and the intake suction chamber.

3. The air-conditioning system of claim 1, wherein said first valve is opened at regular intervals to ensure a sufficient supply of lubricant in said compressor, said lubricant being contained in the refrigerant medium.

4. The air-conditioning system of claim 1, wherein pressure levels are stabilized and regulation properties are improved by opening said first valve and said second valve simultaneously.

5. The air-conditioning system of claim 1, wherein an increase in performance of the air-conditioning system is achievable by keeping one of said first and second valves closed and keeping the other of said first and second valves open.

6. The air-conditioning system of claim 1, wherein the variable-stroke compressor comprises a wobble-plate with a variable tilt angle, and wherein varying said tilt angle serves to control pressure in the high pressure outlet chamber to remain below a permissible high-pressure limit, and wherein said varying of the tilt angle is regulated with a sufficient accuracy and with a sufficiently fast dynamic response so that as a result the air-conditioning system can be operated at pressure levels near said permissible high-pressure limit.

7. The air-conditioning system of claim 1, wherein the system is selectively operable in a heat-pump mode and a refrigeration mode and wherein the outlet chamber pressure or the intake suction pressure is used as control variable depending on whether the system is used as a heat pump or as a refrigeration system.

8. The air-conditioning system of claim 1, wherein a target value for a pressure to be set and maintained by the control unit through said first and second valves can be adjusted within a range that is wide enough to allow appropriate pressure levels to be set for operating the system in a refrigeration mode as well as a heat pump mode.

9. The air-conditioning system of claim 1, wherein a cycle time of said first and second valves can be increased during operating phases when the air-conditioning system operates at a stationary level of cooling power output, in order to increase the useful operating life of said first and second valves.

10. The air-conditioning system of claim 1, wherein a cyclic actuation of the valves can be suspended when the compressor is turned off.

* * * * *